United States Patent [19]

Evans et al.

[11] Patent Number: 5,163,052
[45] Date of Patent: Nov. 10, 1992

[54] HIGH RELIABILITY COMPUTER DIAGNOSTICS SYSTEM

[75] Inventors: Eric A. Evans, San Diego; Gary L. Johnston, Poway; Masami S. Kaino, Del Mar; Joseph D. Rusell, San Diego; Ramiz H. Zakhariya, Valley Center, all of Calif.

[73] Assignee: NCR Corporation, Dayton, Ohio

[21] Appl. No.: 420,862

[22] Filed: Oct. 12, 1989

[51] Int. Cl.⁵ .............. G06F 11/00; G01R 31/28
[52] U.S. Cl. .................. 371/18; 371/16.1; 371/9.1; 364/DIG. 1; 364/267.4; 364/269.2
[58] Field of Search ............ 364/267, 267.4, 269.2; 371/18, 16.1, 9.1; 395/575

[56] References Cited

U.S. PATENT DOCUMENTS

| | | | |
|---|---|---|---|
| 4,246,637 | 1/1981 | Brown et al. | 364/200 |
| 4,439,826 | 3/1984 | Lawrence et al. | 364/200 |
| 4,486,829 | 12/1984 | Mori et al. | 364/200 |
| 4,503,534 | 3/1985 | Budde et al. | 371/9 |
| 4,503,535 | 3/1985 | Budde et al. | 371/11 |
| 4,589,066 | 5/1986 | Lam et al. | 364/200 |
| 4,606,024 | 8/1986 | Glass et al. | 371/16 |
| 4,674,089 | 6/1987 | Poret et al. | 371/25 |
| 4,729,124 | 3/1988 | Hansel et al. | 371/18 |
| 4,870,704 | 9/1989 | Matelan et al. | 364/200 |

*Primary Examiner*—Charles E. Atkinson
*Attorney, Agent, or Firm*—Gregory P. Gadson

[57] ABSTRACT

In a multiple-board computer system, diagnostics are primarily performed by highly reliable microcontroller units (MCUs) on each processor (and memory) board. Operated separately from the board central processing units so that board failure will not prohibit diagnostic routines, the MCUs are serially connected to a bus separate from the main bus. Redundant diagnostic processor board MCUs constantly monitor the other MCUs and the serial bus, and oversee the operation of an MCUs on a malfunctioning board. In an alternate embodiment the diagnostic processor boards are replaced by a microcomputer serving as a monitor.

4 Claims, 3 Drawing Sheets

HIGH RELIABILITY COMPUTER DIAGNOSTICS SYSTEM

BACKGROUND OF THE INVENTION

The present invention generally relates to computer system diagnostics, and more particularly to a method and apparatus for reliably performing diagnostics in a multiple-board computer system.

Broadly considered, diagnostics are routines performed on and by a computer system to determine if all components are functioning properly. Diagnostics are usually performed immediately after power-up, and periodically during operation of the system. When problems in the system are encountered, error messages may be sent to the user, and in some systems—to a degree, at least—automatic corrective action (unbeknownst to the user) can be taken.

Prior art computer systems use the central processing unit (CPU) to perform diagnostics. However, the ability to perform diagnostics in prior art systems depends on the operability of the CPU. For example, if the CPU fails, no information as to the cause of a system problem is available to the user. Additionally, no automatic corrective action can be initiated.

SUMMARY OF THE INVENTION

In light of the above, it is an object of the present invention to provide a new and improved scheme for performing computer system diagnostics independently of CPUs.

It is another object of the present invention to provide such a scheme for a multiple-board (system processors, system memory, etc.) computer system.

It is yet another object of the present invention to meet the above objects in a tightly-coupled computer system (one in which the main memory is shared among all processors via a local bus, rather than having a large memory on each board.

It is still a further object of the present invention to provide redundancy in the control of the diagnostics for even greater reliability.

Broadly speaking, there is provided in accordance with the present invention, a computer system capable of performing diagnostics. In the preferred embodiment the computer system has at least one system processor board, the components of the system processor board being inter alia, at least one CPU for controlling the operation of the system processor board, and at least one microcontroller unit (MCU) operable independently of the CPU for performing at least a portion of the diagnostics.

The preferred embodiment is a tightly-coupled, multiple-board computer system which contains inter alia, a plurality of system processor boards, each system processor board having at least one CPU for controlling the operation of the system processor board, and at least one MCU operable independently of the CPU for performing at least a portion of the diagnostics, a main bus coupled to each CPU of each system processor board allowing communication between each system processor board, and a separate diagnostic bus coupled to each MCU for allowing communication between each MCU. Two diagnostic processor boards each having their own MCU monitor the other MCUs and oversee the diagnostics of a malfunctioning board.

In an alternate embodiment a separate microcomputer is substituted for the diagnostic boards.

The details of the present invention will be revealed in the following description with reference to the attached drawings.

DESCRIPTION OF THE PREFERRED EMBODIMENT

Figure 1:
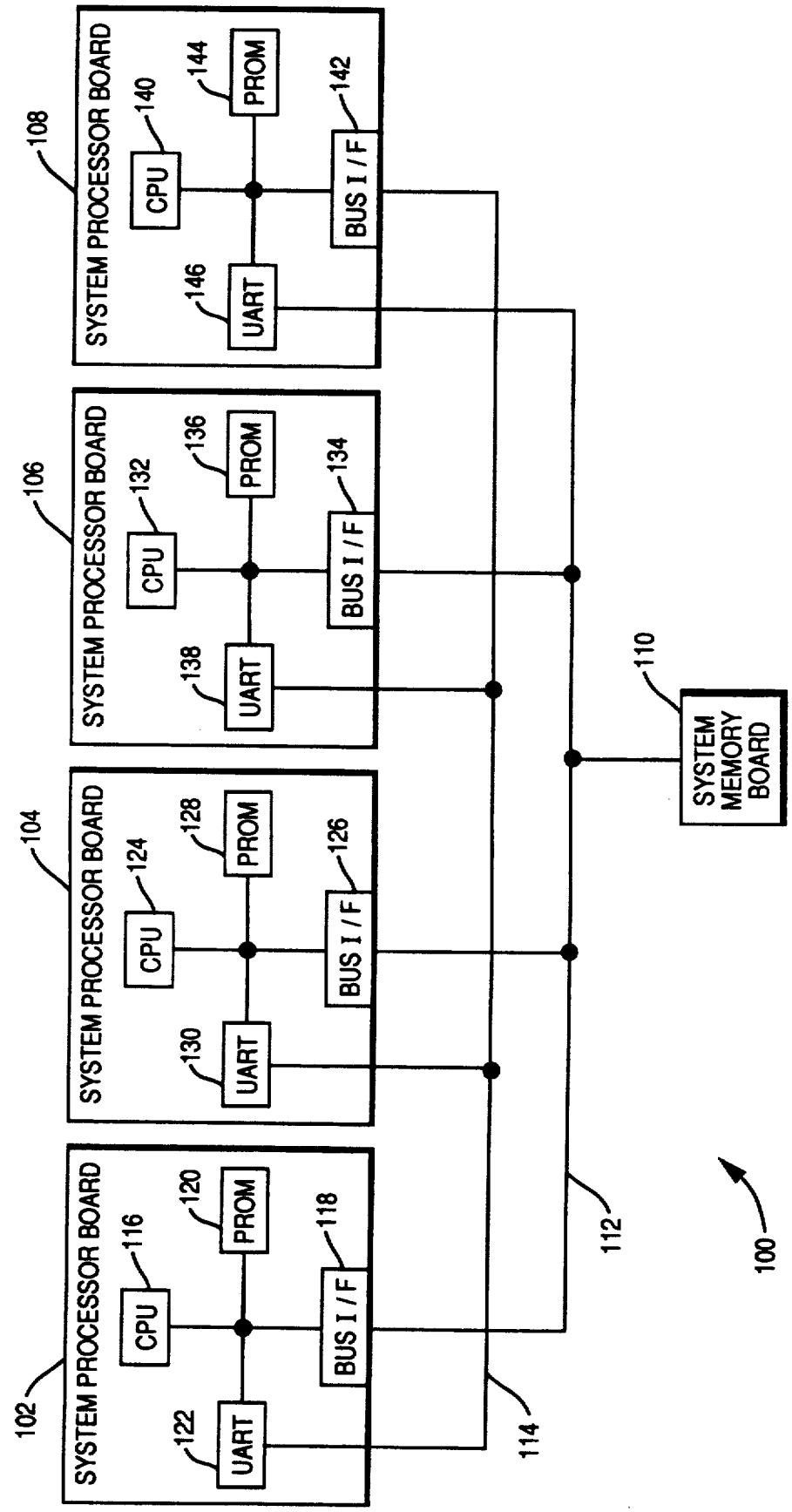
FIG. 1 is a schematic block diagram of a prior art tightly-coupled, multiple-board computer system with a serial diagnostic bus.

FIG. 1 shows a prior art tightly-coupled, multiple-board computer system 100. The system 100 contains several processor boards 102, 104, 106 and 108, as well as a system memory board 110. A processor-memory bus 112 connects all of the processor boards 102-108 to the system memory board 110. The processor-memory bus 112 may be of the parallel, high-speed type. A serial diagnostic bus 114 is also connected to each of the processor boards 102-108.

Each processor board 102-108 contains, respectively, a CPU 116, 124, 132 and 140 for performing diagnostic routines well known in the art (as well as executing application and other programs during routine operation of the system 100), a bus interface module 118, 126, 134 and 142, which contains logic for interface between the respective processor board and the processor-memory bus 112, a programmable read-only memory (PROM) 120, 128, 136 and 144, which may contain start-up code for determining how to load the main memory, as well as diagnostics used to verify that the board is functioning, and a universal asynchronous receiver/transmitter (UART) 122, 130, 138 and 146, which converts parallel diagnostics information received from the CPU to serial diagnostics information to be transmitted over the serial diagnostics bus 114 when the processor-memory bus 112 is not functioning properly.

The UARTs also convert serial diagnostics information received from the serial diagnostics bus 114 to parallel diagnostics information to be relayed to the CPUs. The UART-serial diagnostic bus path is not normally operational, except that it may be used for communicating status information regarding diagnostics.

The system 100 as disclosed is found in a number of commercially available computer systems, such as the NCR 800 Class Tower Computer sold by NCR Corporation, Dayton, Ohio.

Figure 2:
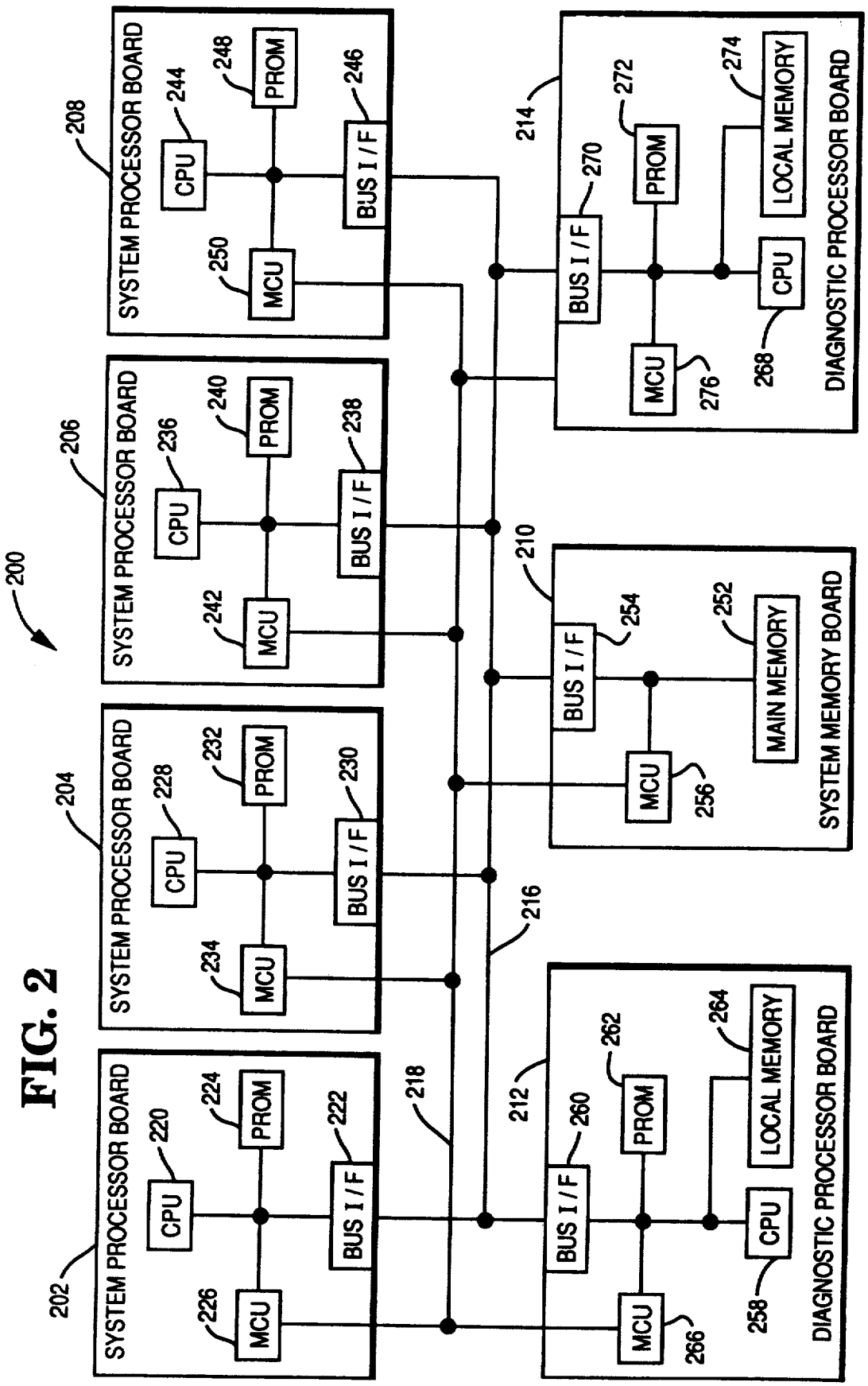
FIG. 2 is a schematic block diagram of the presently inventive tightly-coupled, multiple-board computer system with a serial diagnostic bus utilizing a network of MCUs directed by diagnostic processors.

The improved tightly-coupled, multiple-board computer system 200 in FIG. 2 contains system processor boards 202-208, a system memory board 210, and diagnostic processor boards 212-214. The system processor boards 202-208 contain CPUs (220, 228, 236 and 244), bus interface modules (222, 230, 238 and 246), PROMs (224, 232, 240 and 248), which function similarly to the corresponding components in FIG. 1, except that the CPUs do not perform the bulk of the diagnostic routines. A main or processor-memory bus (parallel, high-speed) 216 operates similarly to the corresponding bus 112 in FIG. 1, except that it does not communicate the majority of the diagnostics information.

The system processor boards 202-208 also contain intelligent MCUs 226, 234, 242 and 250 which are connected to a serial diagnostics bus 218. Highly reliable, MCUs have been observed to have a lower failure rate than CPUs. In the preferred embodiment the-MCUs have built-in diagnostics programs (stored in internal non-volatile memory as opposed to separate/discrete PROMS used in prior art arrangements) of a suitable prior art type which is specifically adapted for use with the system of the preferred embodiment. The MCUs perform most of the diagnostic functions that are all performed by the CPUs in the system 100 of FIG. 1, including determining whether the appropriate lines are connected, and whether the bus interface modules are functioning. As with the CPUs in the prior art, the MCUs of the present invention can take a limited amount of corrective action when problems are discovered.

Unlike the prior art system memory board 110, the system memory board 210 having main memory 252, a bus interface module 254 and an MCU 256, can perform memory testing without the need to use the processor-memory bus 216. The MCU 256 tests the main memory 252 and the bus interface logic module 254 and is connected to the serial diagnostics bus 218.

The computer system 200 also contains two redundant diagnostic processor boards 212 and 214 which monitor and control the operation of the system processor board and system memory board MCUs. (Strictly speaking, the diagnostic processor board 214 "listens" for problems with the diagnostic processor board 212, and is only operational when the diagnostic processor board 212 is malfunctioning.) The diagnostic processor board 212 contains a CPU 258, a bus interface module 260 connected to the processor-memory bus 216, a PROM 262, a local memory 264 and a diagnostic MCU 266 connected to the serial diagnostic bus 218.

The MCU 266 constantly monitors the MCUs on the system processor boards 202-208 and on the system memory board 210 by receiving status information. In other words, the diagnostic MCU constantly queries the other MCUs as to whether problems exist upon the other boards. When a problem is discovered by one of the MCUs on the system processor boards or the system memory board, the diagnostic MCU decides upon which diagnostics are appropriate and informs the MCU on the defective board of the decision, which is followed by action on the decision by the MCU on the defective board. In addition to monitoring and controlling the MCUs, the diagnostic MCU determines whether the serial diagnostic bus 218 is defective. The diagnostic MCU 266 may also run conventional diagnostic routines on the other components on the diagnostic processor board 212.

The CPU 258 is different from the CPUs on the system processor boards in that in the preferred embodiment it performs some high level diagnostics (with the aid of the local memory 264, which provides a "working area", the PROM 262, which contains start-up and diagnostics code for the CPU 258, and the bus interface module 260, which provides an interface between the CPU 258 and the main memory 252). However, failure of the CPU 258 will not prevent the diagnostic MCU 266 from continuing to direct lower level diagnostics.

The level of the diagnostics performed by the CPU 258, although higher than those performed by the MCU 266, is nonetheless lower than that of the CPUs in prior art computer systems, such as the one illustrated in FIG. 1.

High level diagnostics are carried out while the operating system is running, and include, for example, counting the number of bus accesses by a processor to see if the actual number varies significantly from an expected number, and checking for system transmission errors. Low level diagnostics are carried out while the operating system is not running, and include, for example, testing a processor (e.g., comparing the actual results of a diagnostic routine with the expected results), and checking data transmission between a processor and an auxiliary storage device.

The diagnostic processor board 214 with its diagnostic MCU 276, CPU 268, local memory 274, PROM 272 and bus interface module 270 functions identically to the diagnostic processor board 212, in the case where the diagnostic processor board 212 fails. Otherwise the diagnostic processor board 214 remains inactive. The redundant diagnostic processor board 214 provides an added degree of reliability for the computer system 200.

Figure 3:
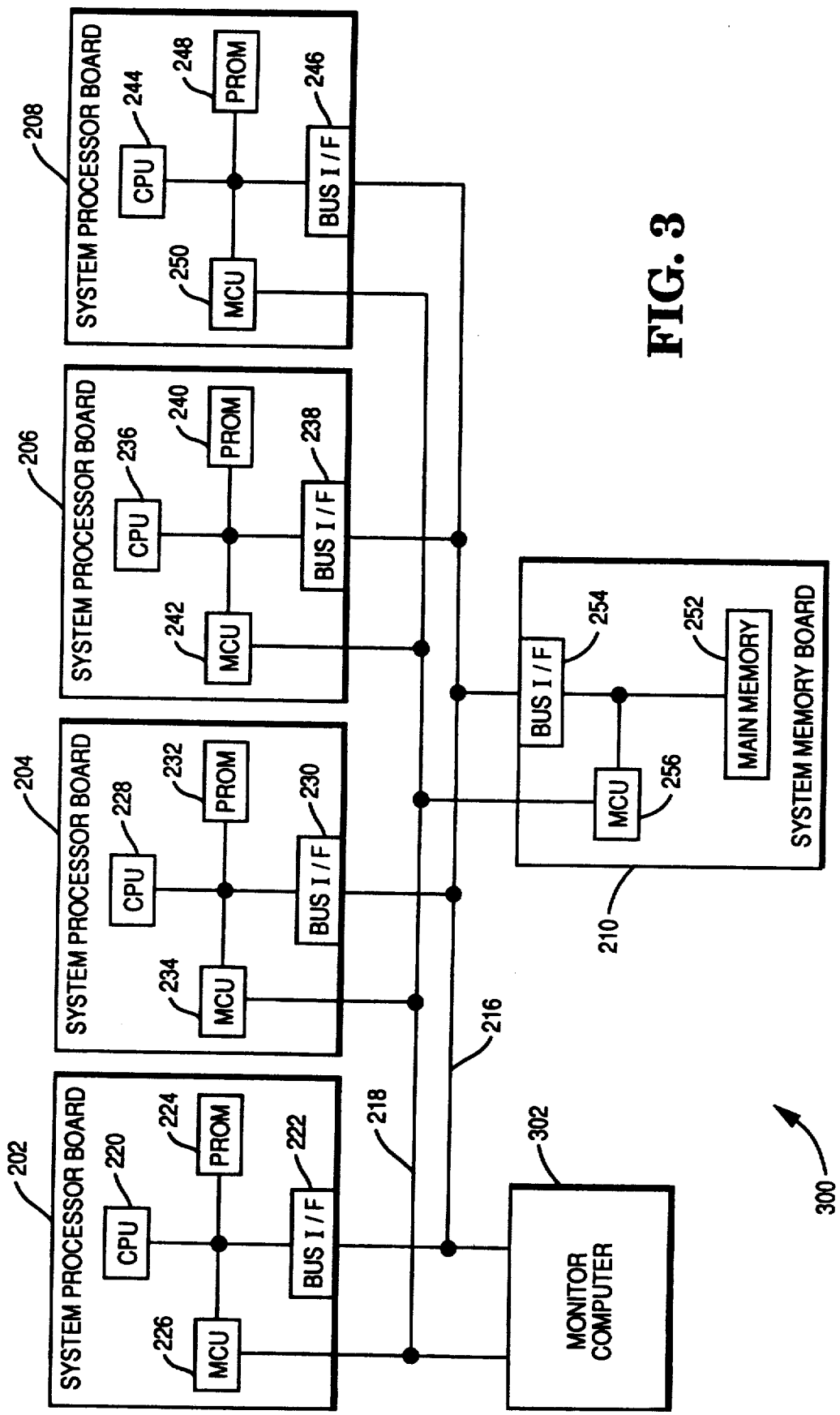
FIG. 3 is a schematic block diagram of a modified version of the computer system in FIG. 2 having a separate microcomputer in place of the diagnostic processor boards.

In FIG. 3, there is illustrated an alternate embodiment of the present invention where a monitor computer 302 such as a microcomputer takes the place of the diagnostic processor boards 212 and 214 in a modified version 300 of the computer system 200 in FIG. 2. The monitor computer 302 should have processing power at least matching that of processor boards 212 and 214 in order to maintain the same level of diagnostics performance. All of the functions performed by the diagnostic processor boards 212 and 214 are performed by the monitor computer 302.

Variations and modifications to the present invention are possible given the above disclosure. However, all such variations and modifications are intended to be within the scope of the invention claimed by this letters patent.

For example, the method covered by the present invention is not limited to use with tightly-coupled computer systems, and can be used with loosely-coupled computer systems as well. The present invention is not limited in scope to the same number of system processor, system memory and diagnostic processor boards as illustrated in the preferred embodiment.

We claim:

1. A multiple-system board computer system capable of performing diagnostics comprising:
   a plurality of processor system boards, each processor system board comprising at least one central processing unit (CPU) for controlling the operation of said processor system board, and at least one microcontroller unit (MCU) operable independently of said CPU for performing at least a portion of said diagnostics pertaining to the processor system board where the particular MCU resides;
   at least a memory system board, comprising at least one MCU for performing at least a portion of said diagnostics pertaining to the memory system board where the particular MCU resides;
   a main bus coupled to each said CPU of each said processor system board and to memory of each said memory system board, allowing communication between each said system board;
   a separate diagnostic bus coupled to each said MCU for allowing communication between each said MCU; and at least a first diagnostic processor system board coupled to said main bus and having at least one MCU coupled to said diagnostics bus for monitoring all of the MCUs and for controlling the operation of an MCU on a system board when that system board is determined by its MCU to be malfunctioning;

wherein diagnostics for each said system board may be self-performed by each said system board.

2. The multiple-board computer system in claim 1 wherein said MCU on said first diagnostic processor board also determines if said diagnostic bus is malfunctioning.

3. The multiple-system board computer system in claim 2 further comprising at least a second but redundant diagnostic processor system board coupled to said main and diagnostic buses, and operational in the same manner as said first diagnostic processor system board, except that said second diagnostic processor system board is only operational when said first diagnostic processor system board is malfunctioning.

4. The multiple-system board computer system in claim 1 further comprising at least a second but redundant diagnostic processor system board coupled to said main and diagnostic buses, and operational in the same manner as said first diagnostic processor system board, except that said second diagnostic processor system board is only operational when said first diagnostic processor system board is malfunctioning.

* * * * *